Sept. 15, 1953        A. A. WILSON        2,652,479
COMBINED FLASHLIGHT AND MIRROR SUPPORT
Filed Jan. 27, 1950        2 Sheets-Sheet 1
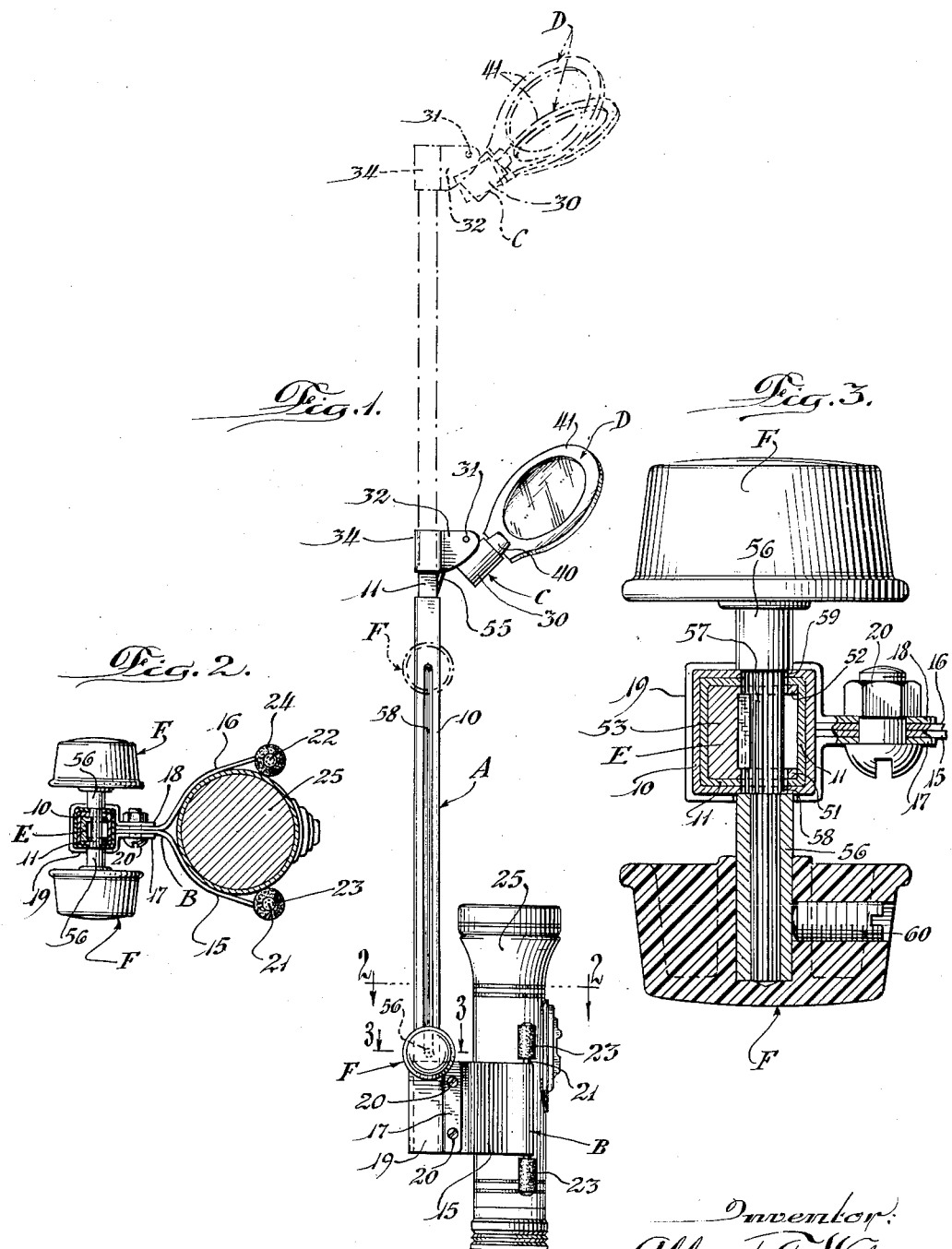
Inventor:
Albert A. Wilson
By Hinkle, Harken, Ahlberg, Hansmann & Wupper
Attorneys.

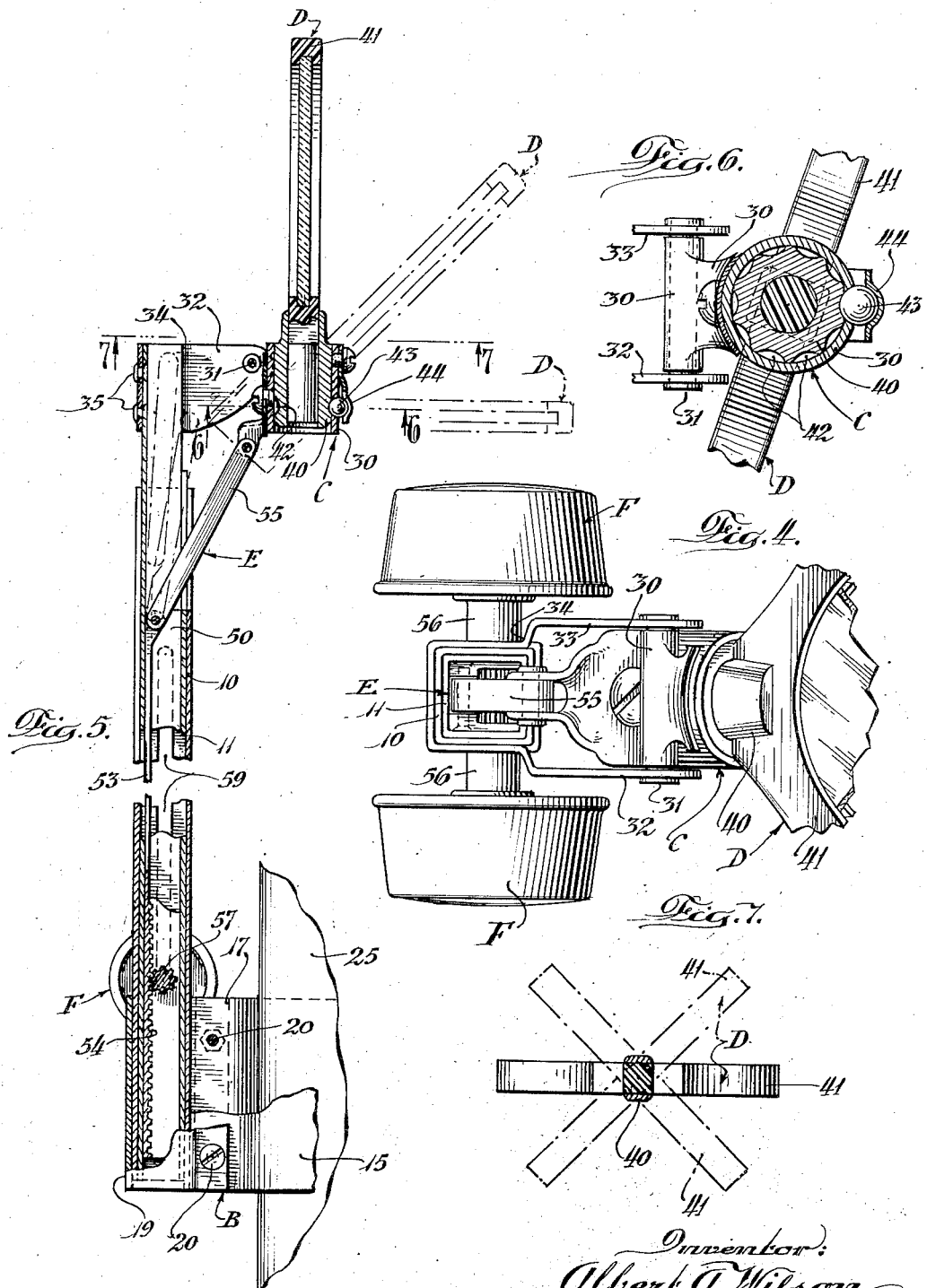

Patented Sept. 15, 1953

2,652,479

UNITED STATES PATENT OFFICE 2,652,479

COMBINED FLASHLIGHT AND MIRROR SUPPORT

Albert A. Wilson, Chicago, Ill.

Application January 27, 1950, Serial No. 140,916

1 Claim. (Cl. 240—2.18)

My invention relates to a combined flashlight and mirror support.

More particularly it is an instrument or tool in the form of an elongated support which can carry an ordinary flashlight adjacent one end and a mirror, adjustable both as to distance from and as to angular relation to the flashlight, adjacent the other end, angular adjustments of the mirror being possible while the mirror is in the desired position for use.

The principal object of the invention is to provide an instrument or tool which may be effectively employed in making inspections and repairs in normally dark and invisible—or at least not clearly visible—locations, such for example, as, especially after installation, the underside of the engines and power transmitting and braking systems of automobiles, trucks, buses, airplanes and locomotives, and also concealed plumbing, electrical wiring and the like.

Another object is to provide a combined flashlight and adjustable mirror support whereby the distance between the flashlight and mirror may be readily varied and, at any adjusted separation, the angular relation of the mirror to the flashlight beam and the "line of sight" may be changed without requiring that the instrument be withdrawn to make the desired adjustments.

A further object is to provide such a tool or instrument which will readily render available for use either side of a two sided mirror, one side reflecting, for example, a normal image and the other a magnified image.

Another object is to provide such an instrument or tool which is reliable, simple and easy to manipulate and which can be manipulated by one hand of an operator, leaving the other hand free for necessary work.

Other objects and advantages will hereinafter appear.

An embodiment of my invention is illustrated in the accompanying drawings, wherein:

Fig. 1 is a side elevation of the tool or instrument, contracted condition being shown in full lines and substantially fully extended condition and mirror adjustments being indicated by dot-dash lines;

Fig. 2 is a somewhat enlarged cross section on the line 2—2 of Fig. 1;

Fig. 3 is a still more enlarged section on the line 3—3 of Fig. 1;

Fig. 4 is an enlarged end elevation of the front or mirror end of the tool;

Fig. 5 is a longitudinal section;

Fig. 6 is an enlarged section on the line 6—6 of Fig. 5; and

Fig. 7 is a section on the line 7—7 of Fig. 5, indicating some positions of axial or horizontal adjustment of the mirror.

In general the tool or instrument comprises an elongated telescopic handlebar A having at one end (the outer or rear when in use) a carrier B for an ordinary flashlight and at the other end (the inner or front when in use) an adjustable mirror carrier C for a mirror D, the mirror carrier being tiltable in any condition of the handlebar by manipulation of a tilting mechanism E operable, for example, by either of a pair of knobs F.

The handlebar A consists of a plurality (two being shown) of sections 10 and 11 of metal tubing, preferably of square cross section. The outer, and when in use rear section 10 has the flashlight carrier B attached adjacent the end into which section 11 fits. The inner and when in use forward section 11 has the mirror carrier C pivotally attached thereto adjacent the end opposite that which fits into section 10. Thus, when the two handlebar sections 10 and 11 are moved longitudinally or telescopically in and out relative to each other the distance between or spacing of the flashlight and mirror carriers is decreased or increased.

The flashlight carrier B is preferably in the form of a saddle consisting of two outwardly curved spring clips or wings 15 and 16 which converge and are clamped together and attached to the upstanding flanges 17 and 18 of a bracket 19. Bolts 20 will serve this clamping and attaching function. Bracket 19 is formed as a sleeve which fits about the outer handlebar section 10, the sleeve and section being secured together in any appropriate manner, such as by the clamping bolts 20 or by welding or soldering. The outer parallel tips of wings 15 and 16 may be rolled over small rods 21 and 22, respectively, each rod being equipped with a rubber grip or roller 23 or 24 at opposite ends to facilitate the insertion and removal of an ordinary cylindrical flashlight 25 and insure that the flashlight, when installed, is firmly and yet detachably clamped in position parallel to the longitudinal axis of the handlebar.

Mirror carrier C consists of a socket 30 which is pivotally mounted by a pin 31 to and between the spaced flanges 32 and 33 of a bracket 34. Bracket 34 is formed as a sleeve which fits about the forward end of inner handlebar section 11, the sleeve and section being secured together in any appropriate manner, such as by welding, soldering or rivets 35. The bore of socket 30 is formed to receive the projecting stud 40 on the frame 41 of mirror D. The mirror can be of any desired shape and size. In fact mirrors of several different sizes and shapes, which seem best adapted to meet peculiar and special conditions or service requirements can be supplied. For example, I have found it especially convenient to use a two sided mirror, one side reflecting a normal image and the other side reflecting a magnified image. By making the bore of socket 39 cylindrical and correspondingly shaping stud 40 the mirror may, if desired, be turned on its axis, as indicated in Fig. 7, to vary, transversely of the axis of the handlebar, the angle of reflection, and consequently of vision. In order to lock the mirror detachably to socket 39 and also in any position to which it may be turned about its axis, the socket may, as shown most clearly in Fig. 6, be provided with a circumferentially arranged series of depressions or pits 42 into which fits a ball 43 biased inwardly by a leaf spring 44. By such an arrangement the mirror stud 40 can be easily inserted into and withdrawn from socket 39, to apply or detach the mirror, and yet the two will not accidentally separate; also, although the mirror can be readily turned upon its axis, the mirror will not accidentally shift its position.

Since the mirror socket 39 is pivotally attached to the forward end of the inner handlebar section 11, it and the mirror can be tilted in the plane of the handlebar and flashlight. Such tilting, in normal contracted or in any extended condition of the telescopic handlebar, is effected by the tilting mechanism E. This tilting mechanism includes a sliding rack-bar 50 which is of substantially U-shape having side flanges 51—52 and a bottom wall 53. This rack-bar is slidably supported in inner handlebar section 11 and its bottom wall 53, which for some distance is extended rearwardly beyond the side flanges 51—52 and provided with rack teeth 54, as best shown in Fig. 5. The forward end of rack-bar 50 is pivotally connected by a link 55 to mirror socket 39. A pinion shaft 56, having a toothed central section 57 which meshes with the teeth 54 of rack-bar 50, is journaled in the side walls of inner handlebar section 11 so as to move therewith whenever the inner section is moved longitudinally in or out of the outer handlebar section 10, as shown most clearly in Figs. 1, 3 and 5. This pinion shaft 56 also projects in both directions outwardly through elongated slots 58 and 59 in the side walls of outer handlebar section 10 and to both ends of the shaft the knobs F are fixed. For assembly and disassembly purposes the connection between one of the knobs F and stud shaft 56 may be detachable, the connection being locked by a set screw 60, as shown most clearly in Fig. 3. Thus, whenever inner handlebar section 11 is telescoped into or out of outer section 10, not only the mirror but also rack-bar 50, pinion shaft 56 and the two operating knobs F follow it. And in any telescopic condition of the handle bar, the turning of a knob F in one direction or the other moves the rack-bar forwardly or rearwardly to tilt the mirror as desired.

It is believed that the advantages, effectiveness and convenience of this illuminating and reflecting instrument or tool will be readily appreciated. Its forward end, carrying the light reflective illuminating and observation mirror, can be inserted through small openings and held by one hand in position for best illumination and observation in normally obscure locations, leaving the operator's other hand free for the use of other tools. Because of the unitary connection between the source of illumination and the light reflecting and observatory mirror there is insurance of the proper basic interrelation, unaffected by adjustments of separation, and mirror angularity will be maintained. And, after preliminary or approximately correct adjustments have been made, the tilting of the mirror to bring the image of the obscure or hidden area, part or region into view, or best condition for observation, is effected by the turning of an accessible knob without the necessity of withdrawing the tool and having again to explore to relocate the position and condition desired. The handlebar can be readily elongated or, if extended, it can be shortened, by pulling out or pushing in the inner or front extension section relative to the outer or rear section, either, for example, by manipulation upon the mirror carrier or one of the tilt adjustment knobs. Longitudinal adjustment by a knob is especially convenient in situations where the mirror is being used after insertion through a relatively small opening. And the fact that a knob can also be used to tilt the mirror adds to the instrument's convenience and effectiveness.

Having thus explained the nature and illustrated and described the preferred embodiment of my invention, what I claim and desire to secure by United States Letters Patent is as follows:

A flashlight mirror support comprising a handle bar consisting of a pair of telescopically arranged tubular sections, said tubular sections being noncylindrical to prevent rotation of one with respect to the other, a flashlight carrier attached at the outer end of one of said sections and adapted to hold a flashlight substantially parallel to said handle bar with its switch accessible, a mirror carrier pivotally attached to the outer end of the other section, said pivot extending transversely of the last said section, a rack disposed within the inner of said tubular sections and adapted for longitudinal movement therein, a pinion meshed to said rack, a transverse stem carrying said pinion and journaled for rotation in said other section, said one section having a longitudinally extending slot to permit passage of said stem, an operating knob secured to said stem, and a link interconnecting the rack and the mirror carrier, whereby with one hand the operator can rotate the knob to advance or retract the rack to tilt the mirror carrier or move the knob longitudinally to change the length of said handle bar, while the other hand grasps the flashlight to support the device and is in a position to operate the switch thereon.

ALBERT A. WILSON.

References Cited in the file of this patent

UNITED STATES PATENTS

| Number | Name | Date |
|---|---|---|
| 300,524 | Starr | June 17, 1884 |
| 998,021 | Marcy | July 18, 1911 |
| 1,036,000 | Pease | Aug. 20, 1912 |
| 1,462,398 | Van Nostrand | July 17, 1923 |
| 2,028,430 | Baddorf et al. | Jan. 21, 1936 |
| 2,093,457 | Kuklin | Sept. 21, 1937 |
| 2,137,881 | Margulies | Nov. 22, 1938 |
| 2,222,879 | Porter | Nov. 26, 1940 |
| 2,260,597 | Beattie | Oct. 28, 1941 |